United States Patent [19]
Miller

[11] Patent Number: 6,104,013
[45] Date of Patent: Aug. 15, 2000

[54] INDUCTION SEALING COVERS WITH TABS

[76] Inventor: Cardell Miller, 318 Westgrove Rd., Hudson, Wis. 54016

[21] Appl. No.: 09/008,537

[22] Filed: Jan. 16, 1998

[51] Int. Cl.[7] ....................................................... H05B 6/10
[52] U.S. Cl. .......................... 219/633; 219/634; 219/670; 159/69; 159/274.2
[58] Field of Search ..................... 219/633, 634, 219/670, 647; 156/69, 272.4, 274.4, 380.2, 380.6, 379.7, 379.8

[56] References Cited

U.S. PATENT DOCUMENTS

| | | | |
|---|---|---|---|
| 3,651,299 | 3/1972 | O'Neill | 219/633 |
| 3,727,022 | 4/1973 | Hamilton | 219/634 |
| 3,808,074 | 4/1974 | Smith et al. | 156/69 |
| 4,539,456 | 9/1985 | Mohr | 219/10.69 |
| 4,707,213 | 11/1987 | Mohr et al. | 219/633 |
| 5,013,878 | 5/1991 | Fries, Jr. | 219/634 |
| 5,418,811 | 5/1995 | Ruffini et al. | 373/152 |
| 5,588,019 | 12/1996 | Ruffini et al. | 373/152 |

*Primary Examiner*—Philip H. Leung
*Attorney, Agent, or Firm*—Jacobson & Johnson

[57] ABSTRACT

An induction sealing apparatus for inductively sealing a cover to a container where the shape of the cover and the shape of the container and the shape of the induction sealing apparatus are different from each other with the induction sealing apparatus directing the magnetic field proximate magnetic focusing members that direct the induction energy into specific regions of the cover so that so that the cover can be heated sufficiently to seal the cover to the container.

17 Claims, 5 Drawing Sheets

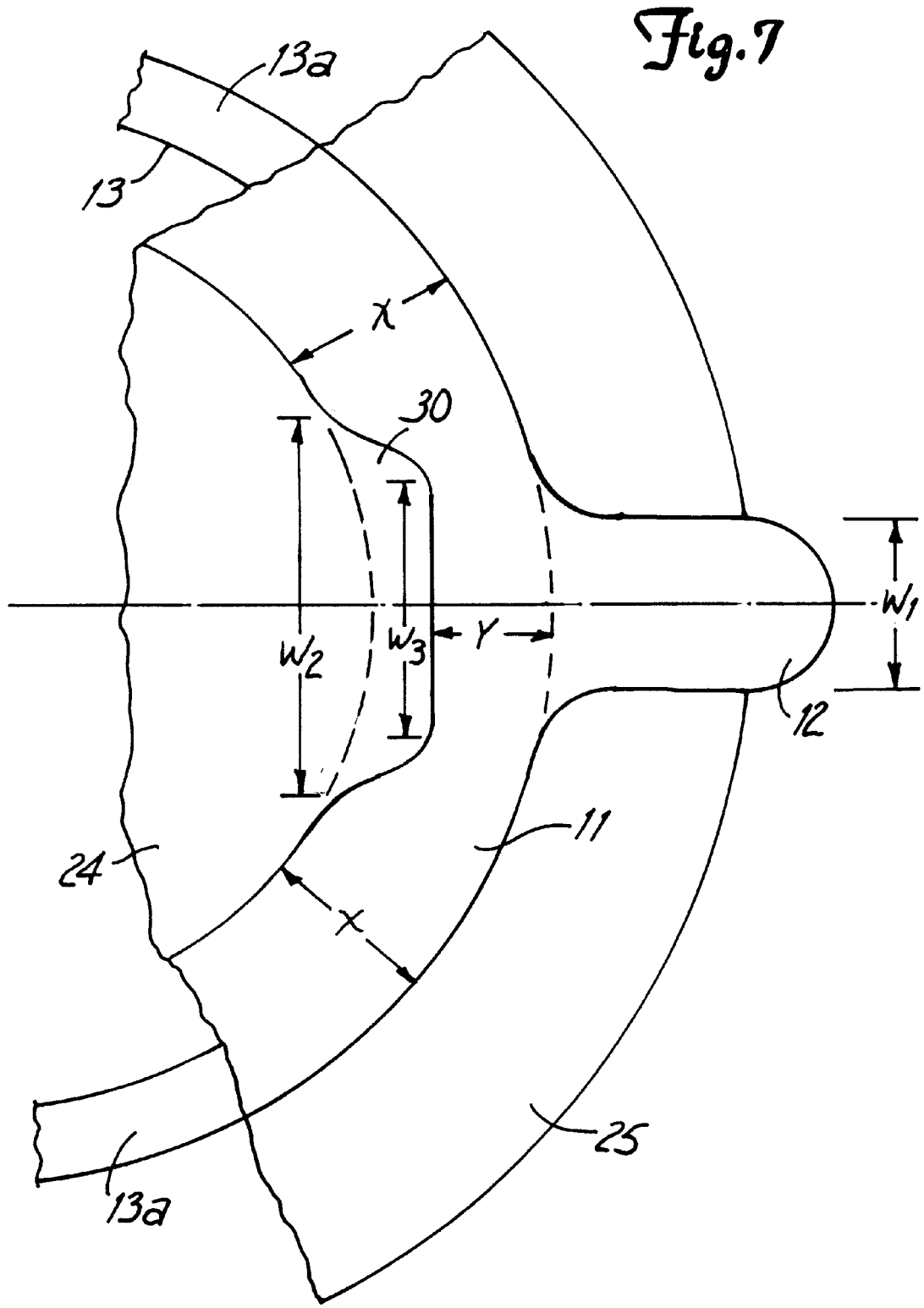

INDUCTION SEALING COVERS WITH TABS

FIELD OF THE INVENTION

This invention relates generally to sealing covers for containers and more specifically, to induction sealing of an irregular shaped cover to a container that does not have a shape that conforms to either the shape of the cover or the shape of the magnetic field generated by an induction coil.

BACKGROUND OF THE INVENTION

The use of induction sealing of innerseal covers to containers is known in the art Typically, a round cover made from a metal foil is inductively sealed to a round container by placing a heat sealable material on one side of the cover and then placing the heat sealable material against the top of the container while the cover is subjected to induction heating. The induction heating heats the cover sufficiently to melt a heat sealable material such as a hot melt adhesive. When the hot melt adhesive cools, the cover adheres to the container. Unfortunately, once the cover is secured to the container, it is difficult for the consumer to remove the cover from a container. In order to make it easier for a consumer to remove the cover from the container, a tab is placed on the cover. The tab can be gasped between the thumb and forefinger so that it is easier for the user to peel the cover off of the container. The induction sealing of an irregular shaped cover with a tab or the like is difficult with a production line induction sealing unit because the elongated induction coils used in the production process to generate a magnetic field do not generate the induction heating in the proper regions of the irregular shaped cover. However, the elongated magnetic field is suitable for mass production of sealing units as it allows the cover and container to remain in the magnetic filed for an extended period of time to allow conduction of heat from one portion of a cover to other portions of the cover. That is, with regular round covers and round container the elongated induction coils are preferred in mass production as it allows the container and the cover to remain under the induction coil for a period of time while the heat generated by the current in the cover is transferred form one region of the cover to another region of the cover. This process works well for cylindrical covers and cylindrical containers; however using induction heating on a cover with an irregular shaped cover such as a cover with a tab one cannot uniformly heat the heat sealable materials on the cover with the elongated induction coils which results in a gap in the seal around the cover.

The present invention provides an apparatus and method for sealing a cover to a container where the shape of the container does not conform to the shape of either the cover or the magnetic field through the use of focusing members or flux concentrators that redirect the magnetic field to heat the cover in the region proximate the irregular shaped cover to thereby melt the heat sealable material so that one can form an airtight peripheral sealing relationship around a cover having a shape that is different from the shape of the container and different from the shape of the induction heating coil.

DESCRIPTION OF THE PRIOR ART

U.S. Pat. No. 4,539,456 discloses an induction heating system for sealing a top member to a bottom member as the members are moved along a conveyor belt.

U.S. Pat. No. 5,418,811 discloses a high performance induction melting coil having homogeneous inserts or a flux concentrator for controlling the direction of inductor flux wherein the insert is made from 80 to 99.5 percent annealed electrolytic prepared iron powder.

U.S. Pat. No. 5,588,019 is a continuation of U.S. Pat. No. 5,418,811 which discloses a high performance induction melting coil having homogeneous inserts for controlling the direction of inductor flux.

SUMMARY OF THE INVENTION

Briefly, the invention comprises an induction sealing apparatus for inductively sealing an irregular shaped cover to a container, with the induction sealing apparatus having a shape different from either the shape of the cover or the shape of the container. In the preferred embodiment the induction sealing apparatus for sealing a cover with an extension tab to a round container includes focusing members or flux concentrators that are concentrically positioned with respect to each other and with respect to a cover and container to direct the induction energy into the circular region of the cover with the focusing members substantially uniformly spaced from each other except in the region where the extension tab is located. In the extension tab region, the focusing members are in closer proximity to each other to ensure that the induction heating of the cover with tab can be heated sufficiently to secure the cover to the container in an airtight seal.

BRIEF DESCRIPTION OF THE DRAWINGS

FIG. 7 is an enlarged top view showing the protrusion relationship of the central focusing member to enable one to secure a cover with tab to a container mouth.

DESCRIPTION OF THE PREFERRED EMBODIMENT

Figure 1:
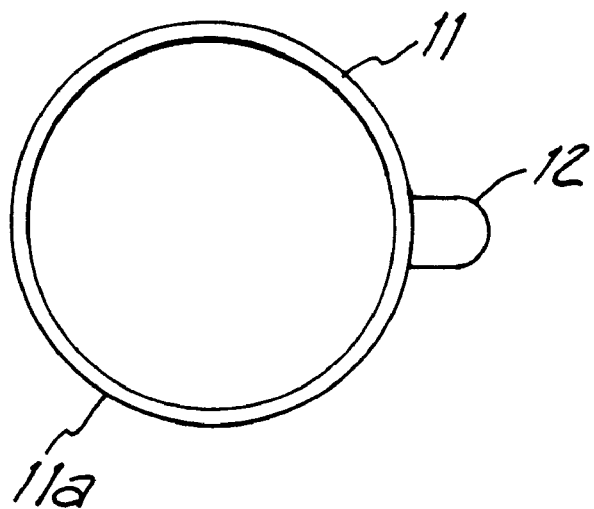
FIG. 1 is a bottom view of a cover with a tab.

FIG. 1 is a bottom view of a circular electrically conducting cover 11 with a radially protruding extension tab 12. Cover 11 has a thickness of approximately one thousandth of an inch and is typically made from a metal foil such as aluminum foil or a laminate thereof. Located on one side of cover 11 is a ring of an adhesive such as a hot melt adhesive 11a Hot melt adhesives are commercially available adhesives that are normally in a hard condition but can be melted by heating which allows the adhesive to be bonded with adjacent surfaces. When the adhesive cools, the two adjacent surfaces are securely fastened to each other. While a hot melt adhesive is shown in certain applications, a heat-sealable cover material could be used if the container material is compatible with the material of the heat sealable cover. In addition to the above heat activateable materials, a heat sealable polymer or the like could be laminated to the foil for securing the foil cover to a container.

Figure 2:
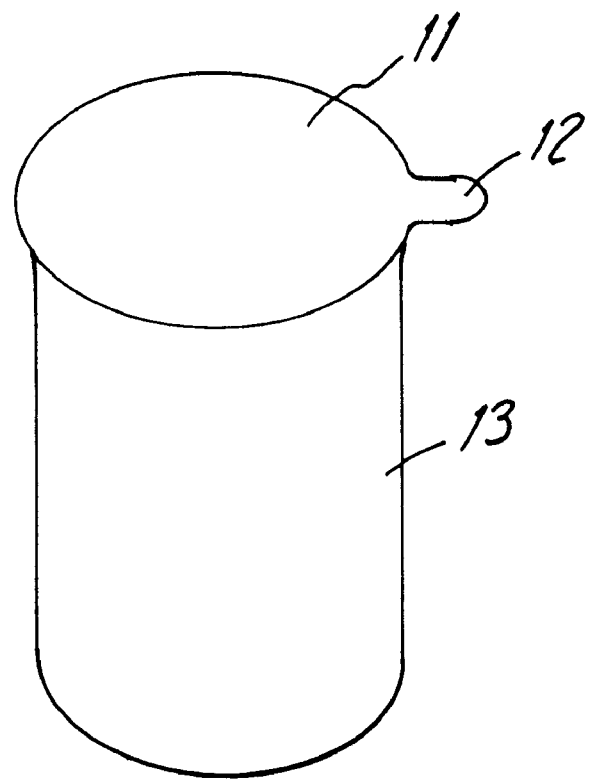
FIG. 2 is a perspective view of a container with the cover of FIG. 1 adhered thereto.

FIG. 2 shows the cover 11 with tab 12 secured to the top of container 13 to form an inner seal for the container. The tab 12 enables a user to quickly and easily peal the inner seal cover 11 from container 13. The present invention provides an apparatus and method for induction sealing of irregularly shaped cover 11 to a container through the coaction of magnetic focusing members that direct the induction energy into the heat sealable materials so that the entire peripheral region of the cover can be secured to a container.

Magnetic focusing or flux concentrators materials are known in the art and are more fully described in U.S. Pat. No. 5,588,019 and U.S. Pat. No. 5,418,811. The magnetic focusing or flux concentrators materials described therein comprise from 80 to 99.5 percent annealed electrolytic prepared iron powder and about 0.5% to about 20% insulating polymer binder.

Figure 3:
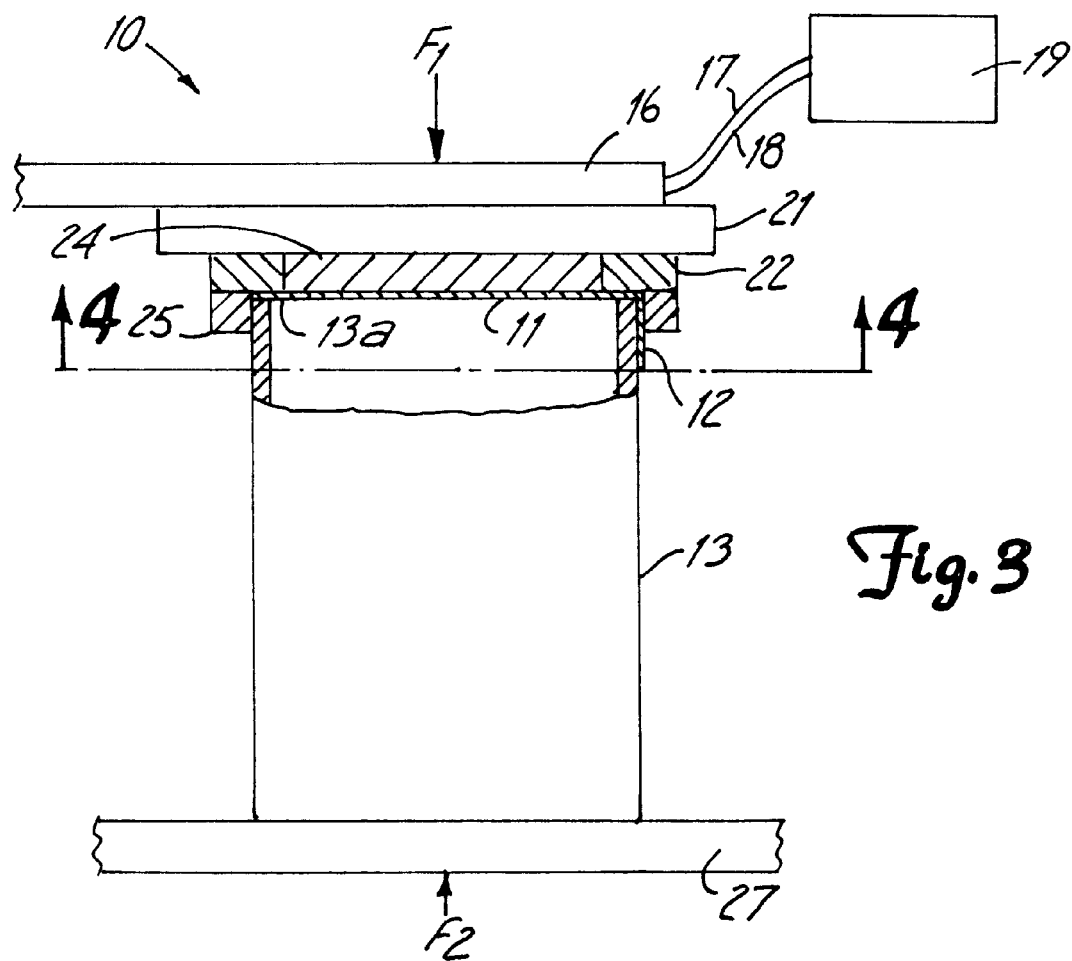
FIG. 3 is a cross sectional view of a container and cover with a tab located in an induction sealing apparatus.

FIG. 3 is a cross-sectional view of container 13 and cover 11 with a tab 12 located in an induction sealing apparatus 10. Induction sealing apparatus comprises an induction coil 16 having electrical leads 17 and 18 connecting to a power source 19. Induction coil 16 is shown located on an electrically insulating holder 21 that includes an annular resilient member 22 for holding cover 11 against the top surface 13a of container 13. However, induction coil 16 need note be located on holder 21 but in close proximity thereto. Located within annular resilient member 22 and radially inward of container 13 is a first focusing member 24 and located radially outward of container 13 is a second focusing member 25 with second focusing member 25 formed into an annular member that can be placed on the outside of container 13. The container 13 rests on a support 27 and members (not shown) provide forces indicated by $F_1$ and $F_2$ to bring the cover 11 with the heat sealable material thereon into a pressure engagement with the container mouth 13a.

Figure 3A:
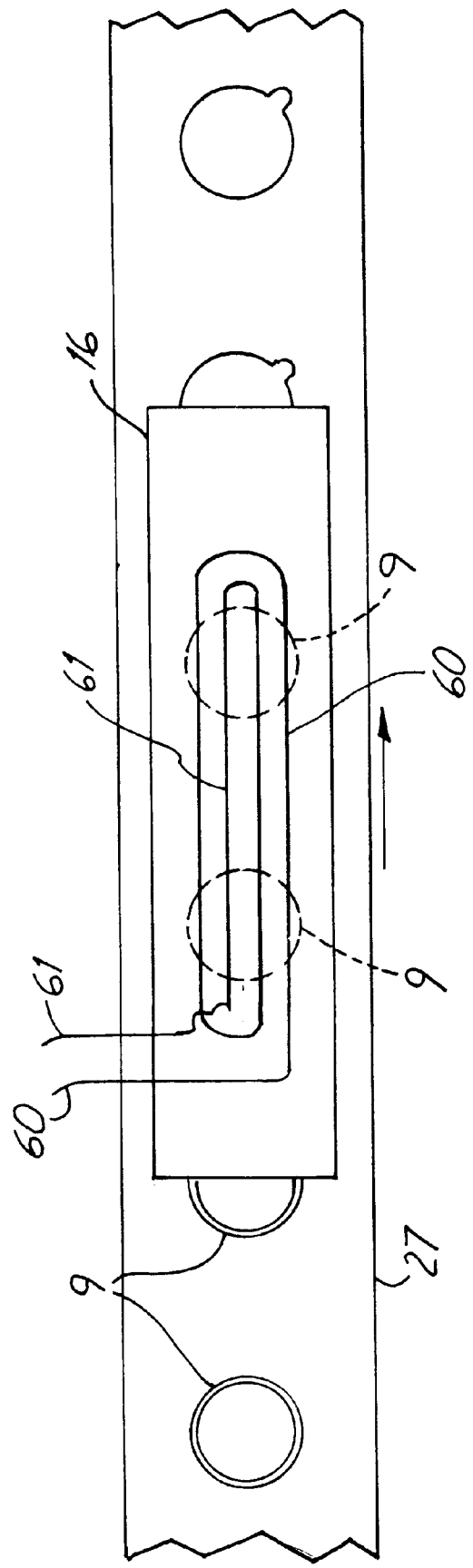
FIG. 3a is a top schematic view of an induction sealing coil and a conveyor belt

FIG. 3A is a top schematic view of an induction sealing coil 16 and a conveyor belt 27 for moving containers 9 thereunder where the induction coil 16 can seal a metal foil to the containers. The direction of motion of conveyor 9 is indicated by the arrow. The coil is shown in an elongated arrangement so that the covers can be induction sealed to the containers. That is, coil 16 which has electrical leads 60 and 61 are located in an elongated arrangement along conveyor 27. The result is that containers 9 which pass under the induction coil 16 continue to receive energy as the container 9 move beneath induction coil 16. This allows heat to be conducted from areas of strong local induction heating of the cover to other areas of the cover where the induction heating is weaker. It should be pointed out that is known that one can control the magnetic field and consequently the electric field by having the shape of the coil in the same shape as the container. For example, a circular coil can be used with a round container to generate a circular magnetic field in the cover, however in contrast the present invention utilizes an induction coil that does not conform to the shape of the cover or the container.

In the present invention one can form a cover 11 with an extension tab 12 from an electrically conducting material such as metal foil which contains a hot melt adhesive or one can place a hot melt adhesive on one side of the cover 11. In the next step one places the cover 11 with the hot melt adhesive in contact with a mouth 13a on a container 13a with the extension tab protruding radially outward of the container 13. In the present invention the outer focusing member 25 is shown attached to sealing member 22 so the extension tab is forced along the side of the container as illustrated in FIG. 3. By placing an annular focusing member 25 around the container and placing a focusing member 24 having a protrusion with the major portion of the focusing member 24 located concentrically with respect to the annular focusing member 25 on top of cover 11. One can use the elongated or race track induction healing coil 16 shown in FIG. 3A to inductively heat the cover for sufficient time to melt the hot melt adhesive. After inductively heating one can cut off the current to the coil while retaining the force on the cover 11 and container 13 to allow the hot melt adhesive to cool under force and thereby adhesively secure the cover to the container.

Figure 4:
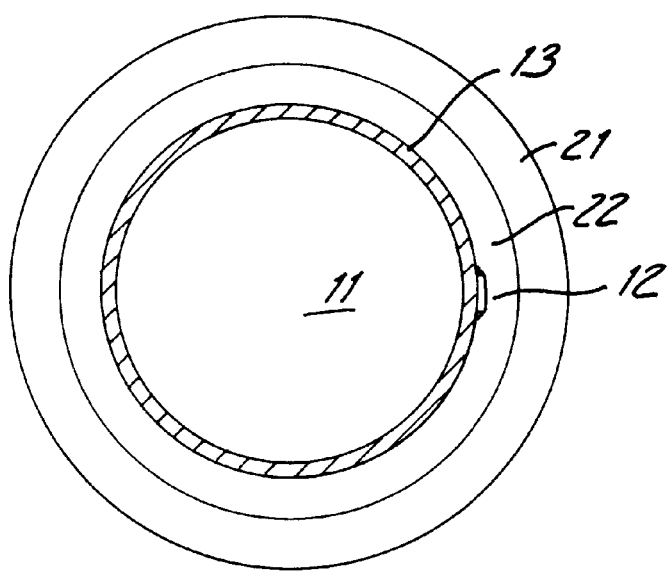
FIG. 4 is across sectional view taken along lines 4—4 of FIG. 3.

FIG. 4 is cross-sectional view taken along lines 4—4 of FIG. 3 showing that the cover tab 12 projects radially outward of container 11 with the resilient member 22 and insulating member 21 located in concentric relationship with each other.

Figure 5:
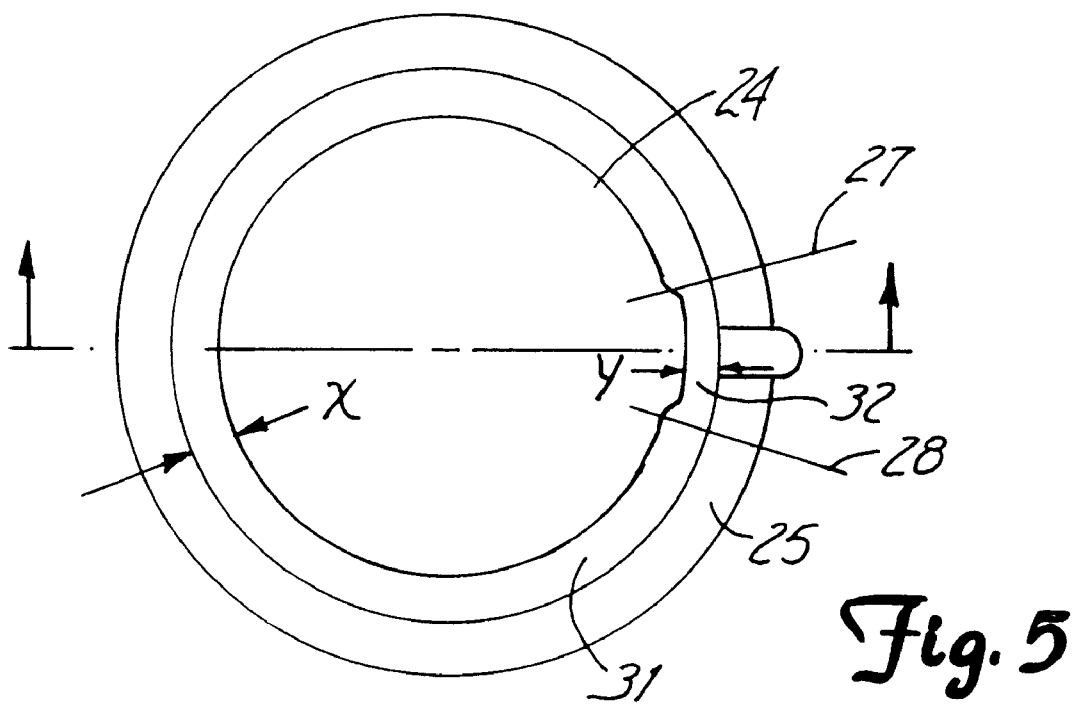
FIG. 5 is a top view showing the concentric relationship of the focusing members for inductively sealing a cover with a tab to a container.

In order to show the relationship of the focusing members without the cover and container reference should be made to FIG. 5. FIG. 5 is a top view showing only the two focusing members 24 and 25. Note, focusing member 24 and 25 are concentrically positioned with respect to each other to form a first region 31 that extends clockwise from line 28 to line 27. The distance between the two focusing members in this region 31 is designated by x and is substantially uniform throughout the region. In the region extending clockwise from line 27 to line 28, the relationship of the focusing members changes with the two focusing members located in closer proximity to each other and separated a distance y which may be as little as 50% of the distance x. With the laterally concentric spacing of the two focusing members 24 and 25 it has been found that one can inductively seal a cover with a tab to a container with an elongated induction coil.

Figure 6:
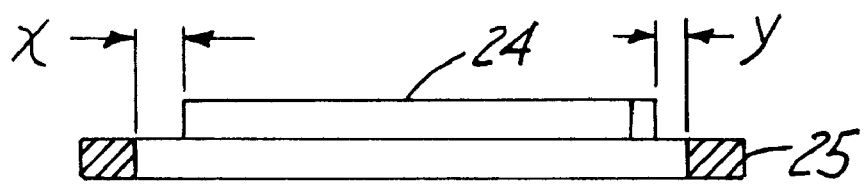
FIG. 6 is side elevation showing only the focusing rings of FIG. 5.

FIG. 6 is a side elevation view showing only the two focusing rings of FIG. 5. The purpose of FIG. 6 is to illustrate that the top focusing member 24 is located above annular focusing member 25 with the lateral spacing between the two focusing members indicated by x and y at different parts around the concentric seal.

FIG. 7 is an enlarged view showing the protrusional relationship of the central focusing members 24 and 25 which are shown in FIGS. 5 & 6. In addition, the cover 11 with tab 12 has been superimposed thereon as has container 13. The protrusion 30 on focusing member 24 is shown to have a bottom width indicated by $w_2$ and a top width indicated by $W_3$ with the width of the protrusion 30 being greater than the width $w_1$ of tab 12. The protrusion member 30 projects upward to decrease the distance between focusing member 25 and protrusion 30 to about half the value of x. The cover 11, which is made of an electrically conducting material, extends from focusing member 25 inward across cover mouth 13a so that the cover 11 can be brought into pressure contact with cover mouth 13awith the induction sealing apparatus.

With the focusing members 24 and 25 positioned as shown in FIG. 7, one can use the apparatus of FIG. 3 to inductively seal cover 11 to a container. That is, it has been found that the spaced concentric relationship of a central focusing member and an annular focusing member with the spacing remaining substantially constant except for a region proximate where the tab on the cover is located provides an effective way to seal a cover with a tab to a container.

It has been found that with the present invention of using focusing rings where a protrusion extends laterally beyond the ring of heat sealable material, one can inductively heat the heat sealable material to a stage where it can be secured to a container in an air tight seal even though the cover includes a tab projects beyond the outer ring of heat-sealing material on the cover.

In addition although both inner and outer focusing members are shown in certain applications the use of a single focusing member is sufficient That is, an inner focusing member could be used to direct the magnetic field outside the central focusing member. The suitable of using a single focusing member will depend on a number of factors including the degree of irregularity of the shape of the cover in comparison to the shape of the container.

I claim:

1. An apparatus for induction heat-sealing a cover with an extension tab to a container comprising:

a holder;

an induction heating coil, said induction heating coil having a first shape with the induction heating coil located proximate a second side of said holder;

a first focusing member;

a second focusing member, said second focusing member concentrically positioned with respect to said first focusing member to form a region extending between said first focusing member and said second focusing member, said first focusing member having a protrusion extending therefrom, said protrusion extending into said region to decrease the region between said second focusing member and said first focusing member to thereby enable said apparatus to inductively heat a cover with a tab to secure the cover with the tab to a container.

2. The apparatus of claim 1 wherein the first focusing member comprises an annular focusing member and the induction coil has an elongated shape.

3. The apparatus of claim 2 wherein the second focusing member has a substantially cylindrical shape with an exterior dimension less than an interior dimension of said annular focusing member.

4. The apparatus of claim 3 wherein the first focusing member and said second focusing member are laterally positioned with respect to each other.

5. The apparatus of claim 4 wherein the region is an annular region of a first width with said protrusion extending a minimum of about half way across said annular region.

6. The apparatus of claim 5 wherein the protrusion has a width that is greater than the width of a tab that is to be inductively sealed to a container.

7. The apparatus of claim 6 wherein the protrusion includes radiused corners.

8. The apparatus of claim 1 including a resilient pad mounted on one side of side holder for resilient engagement with the cover.

9. A method of induction sealing comprising:

forming a heat sealable cover with an extension tab from an electrically conducting material;

placing the heat sealable cover in contact with a mouth on a container with the extension tab protruding radially outward of the container;

placing a first focusing member around the container;

placing a second focusing member having a protrusion on top of said heat sealable cover on top of said heat sealable cover; and inductively heating the heat sealable cover for sufficient time to seal the heat sealable cover with the tab to the container around the entire peripheral region of the container; and allowing the heat sealable material to cool under force to thereby secure the heat sealable cover to the container.

10. The method of claim 9 including the step of aligning the protrusion with the extension tab on said heat sealable cover.

11. The method of claim 10 including the step of placing the second focusing member below the first focusing member.

12. A method of induction sealing comprising:

forming a cover with an extension tab from an electrically conducting material;

placing a hot melt adhesive on one side of the cover;

placing the cover with the hot melt adhesive in contact with a mouth on a container with the extension tab protruding radially outward of the container;

placing an annular focusing member around the container;

placing a focusing member having a protrusion with the major portion of the focusing member located concentrically with respect to the annular focusing member on top of said cover; and inductively heating the cover for sufficient time to melt the hot melt adhesive; and allowing the hot melt adhesive to cool under force to thereby adhesively secure the cover to the container.

13. The method of claim 12 including the step of placing a ring of hot melt adhesive around the peripheral region of the cover.

14. The method of claim 13 wherein the protrusion extends over the ring of hot melt adhesive.

15. The method of claim 14 wherein the focusing member except for the protrusion is located inside the ring of hot melt adhesive.

16. The method of claim 12 including the step of placing a layer hot melt adhesive along the underside of the cover.

17. The method of claim 12 including the step of placing a ring of hot melt adhesive around the peripheral region of the cover.

* * * * *